(12) United States Patent
Rotzoll

(10) Patent No.: US 7,142,838 B2
(45) Date of Patent: **\*Nov. 28, 2006**

(54) WAKE UP DEVICE FOR A COMMUNICATIONS SYSTEM

(75) Inventor: Robert R. Rotzoll, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 220 days.

This patent is subject to a terminal disclaimer.

(21) Appl. No.: 10/869,508

(22) Filed: Jun. 15, 2004

(65) Prior Publication Data

US 2005/0020321 A1      Jan. 27, 2005

Related U.S. Application Data

(63) Continuation of application No. 09/899,370, filed on Jul. 2, 2001, now Pat. No. 6,760,578, which is a continuation of application No. 09/129,258, filed on Aug. 4, 1998, now abandoned, which is a continuation of application No. 08/424,827, filed on Apr. 19, 1995, now Pat. No. 5,790,946, which is a continuation of application No. 08/092,147, filed on Jul. 15, 1993, now abandoned.

(51) Int. Cl.
*H04B 1/16* (2006.01)

(52) U.S. Cl. .................... 455/343.2; 455/574

(58) Field of Classification Search ............. 455/226.1, 455/67.11, 343.1, 343.2, 151.1, 151.2, 353, 455/574; 370/311; 340/10.1, 10.33, 10.34
See application file for complete search history.

(56) References Cited

U.S. PATENT DOCUMENTS

| 4,219,851 | A | * | 8/1980 | Lemak | 360/40 |
|---|---|---|---|---|---|
| 4,328,587 | A | * | 5/1982 | Mizuno et al. | 375/344 |
| 4,410,789 | A | * | 10/1983 | Story | 340/825.72 |
| 4,555,788 | A | * | 11/1985 | Merrill | 375/289 |
| 4,724,545 | A | * | 2/1988 | Hamada | 455/218 |
| 4,771,283 | A | * | 9/1988 | Imoto | 455/352 |
| 4,885,571 | A | * | 12/1989 | Pauley et al. | 340/573.4 |
| 4,955,038 | A | * | 9/1990 | Lee et al. | 455/343.1 |
| 4,961,073 | A | * | 10/1990 | Drapac et al. | 455/343.4 |
| 5,054,052 | A | * | 10/1991 | Nonami | 455/574 |
| 5,055,968 | A | | 10/1991 | Nishi et al. | 361/395 |
| 5,145,346 | A | * | 9/1992 | Iio et al. | 418/55.5 |
| 5,181,227 | A | * | 1/1993 | DeLuca et al. | 455/343.2 |
| 5,194,860 | A | * | 3/1993 | Jones et al. | 340/870.02 |
| 5,245,346 | A | | 9/1993 | Nishimura et al. | 342/42 |
| 5,379,453 | A | * | 1/1995 | Tigwell | 455/352 |
| 5,507,040 | A | * | 4/1996 | Eaton et al. | 455/343.2 |
| 5,541,976 | A | * | 7/1996 | Ghisler | 455/426.1 |

FOREIGN PATENT DOCUMENTS

WO      WO 90/11652      10/1990

* cited by examiner

*Primary Examiner*—Quochien B. Vuong
(74) *Attorney, Agent, or Firm*—Wells St. John P.S.

(57) ABSTRACT

The present invention teaches a communications system comprising a first communications device for receiving data and a wake up signal. The first communications device comprises an active mode of operation and a sleep mode of operation for reducing power consumption. Further, the system comprises means for switching the first communications device to and from sleep mode in response to receiving the wake up signal. Further, the system comprises a second communications device for transmitting data to the first device during its active mode, while transmitting the wake up signal to the first device during its sleep mode.

15 Claims, 4 Drawing Sheets

WAKE UP DEVICE FOR A COMMUNICATIONS SYSTEM

CROSS-REFERENCE TO RELATED APPLICATIONS

This patent application is a continuation of U.S. patent application Ser. No. 09/899,370, filed Jul. 2, 2001, by Robert R. Rotzoll, titled, "Wake Up Device for a Communications System", now U.S. Pat. No. 6,760,578, which is a continuation of U.S. patent application Ser. No. 09/129,258, filed Aug. 4, 1998, now abandoned, which in turn is a continuation of U.S. patent application Ser. No. 08/424,827, filed Apr. 19, 1995, now U.S. Pat. No. 5,790,946, which is a continuation of U.S. patent application Ser. No. 08/092,147, filed Jul. 15, 1993, now abandoned.

FIELD OF THE INVENTION

The present invention relates to a communication systems. More particularly, the invention pertains to a multi-mode communications system.

BACKGROUND OF THE INVENTION

Recently, there has been increased research and development with respect to Radio Frequency Identification ("RFID") device tags. These RFID tags essentially comprise small radio transceivers attached to a movable object. By coupling an RFID tag to an object, it has been intent of developers of creating a system for tracking the whereabouts and identification of the object.

Several RFID systems have been developed. Generally, these designs have been relatively large in size—approximately cigarette package—and have been generally fabricated using hybrid circuit techniques. Besides their bulky size, the systems require the RFID tag to constantly remain activated.

Recently, there have been several breakthroughs in techniques in the design and manufacture of RFID tags. Examples of these include "Radio Frequency Identification Device (RFID) and Method of Manufacture, Including an Electrical Operating System and Method," U.S. patent application Ser. No. 899,777, filed on Jun. 17, 1992, "Anti-Theft Method for Detecting The Unauthorized Opening of Containers and Baggage," U.S. patent application Ser. No. 921,037, Jul. 24, 1992, "Electrically Powered Postage Stamp or Mailing or Shipping Label Operative with Radio Frequency (RF) Communications," U.S. patent application Ser. No. 928,899, filed on Aug. 12, 1992, and "Modulated Spread Spectrum in RF Identification Systems Method," U.S. patent application Ser. No. 032,384, filed on Mar. 17, 1993, all commonly assigned to Micron Semiconductor, Incorporated, and all incorporated herein by reference.

It has been thus a design criteria that these RFID tags be light weight and inexpensive. However, these systems previously have not addressed the need of low power consumption. Presently, RFID tags must be active to detect their location, as well as additional information. As such, there is a need to develop a RFID tag communications system having an active mode for receiving/transmitting data and a sleep mode for reducing power consumption.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE INVENTION

Figure 1:
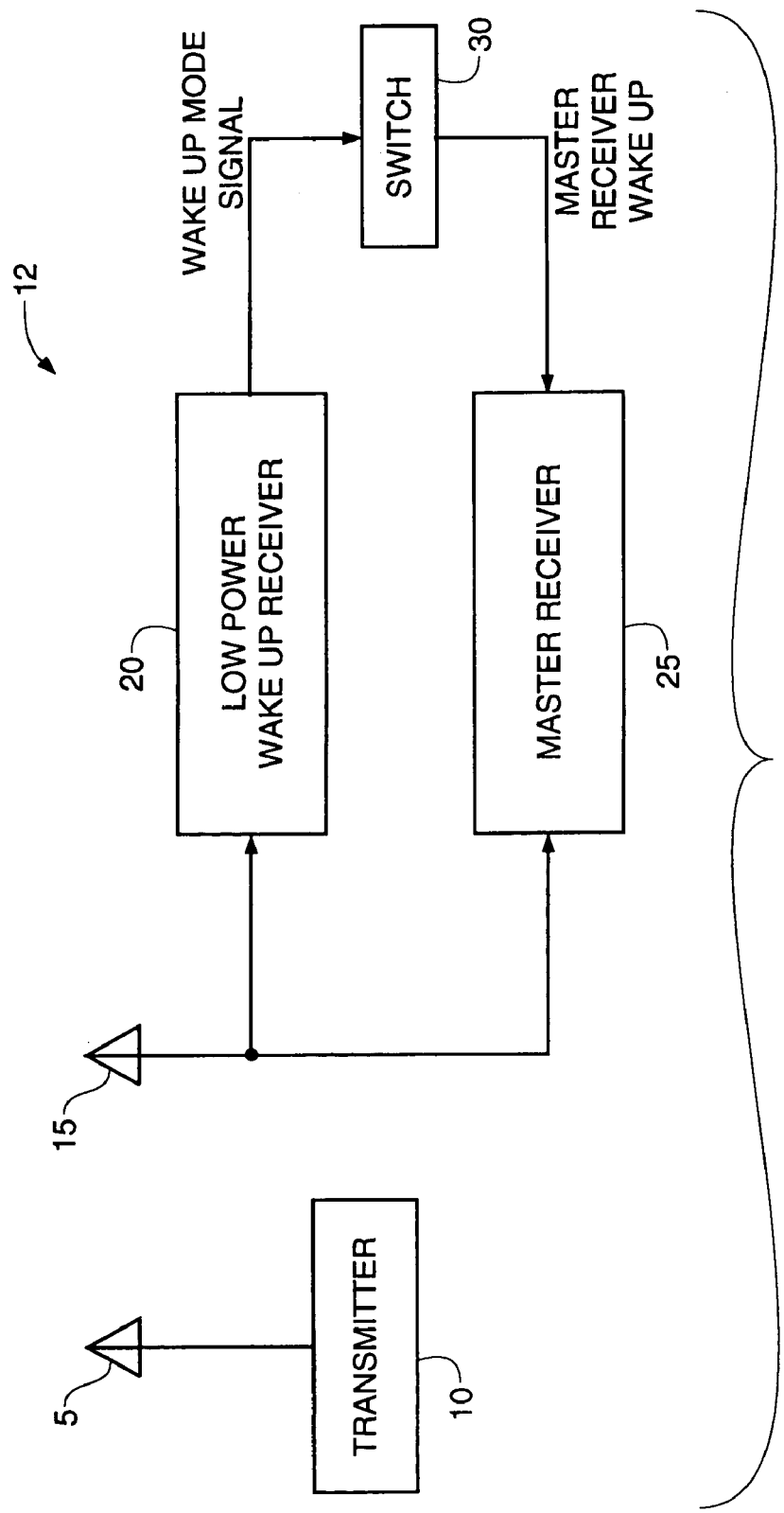
FIG. 1 is an high level architecture of the present invention.

Referring to FIG. 1, a wake up device for a communications system is illustrated. As shown, the system comprises a first and second communications devices; a transmitter 10 and a receiver 12. Transmitter 10 is coupled to antenna 5 in order to properly transmit data and a wake up signal to receiver 12. Receiver 12 comprises a wake up receiver 20 and a master receiver 25, which are both coupled to antenna 15. Further, receiver 12 comprises a switch, which enables the substantial energy savings. It should be noted that the issue of energy saving with respect to transmitter 10 is not important as it is not coupled to an RFID tag, unlike is receiver 12 in the preferred embodiment.

To accomplish these energy savings, master receiver 25 comprises at least two modes of operation. In the preferred embodiment, the first mode is referred to as an active mode of operation and the second mode referred to as a sleep mode. Further, wake up receiver 20 requires substantially less power for its operation than master receiver 25.

In the active mode of operations, master receiver 25 functions as a traditional receiver, capable of receiving data transmitted by transmitter 10. By contrast, in order to reduce power consumption during periods of inactivity, master receiver 25 comprises a sleep mode. During sleep mode, master receiver 25 utilizes a minimal amount of energy for biasing purposes. Thus, by utilizing this design scheme, a substantial power savings from receiver 12 can be achieved, which directly corresponds to the life expectancy of battery powered receiver 12. For example, in one receiver design, a 98% power savings has been observed.

Coupled between master receiver 25 and wake up receiver 20, is switch 30. Switch 30 switches master receiver 25 between its mode of operation—ie., active to sleep mode, as well as sleep mode to active mode—in response to the arrival of a wake up signal. As such, transmitter 10 transmits a wake up signal to receiver 12, which is ultimately received by wake up receiver 20. Upon detecting the wake up signal, a mode change signal is generated to switch 30. Accordingly, switch 30 changes the mode of operation of master receiver.

In the preferred embodiment of the present invention, switch 30 only switches master receiver 25 from sleep mode to active mode. Here, upon receiving wake up signal, wake up receiver 20 generates a mode change signal to switch 30. In response, switch 30 senses the mode of operation of master receiver 25. Thus, switch 30 switches master receiver to active mode upon sensing master receiver 25 as being in sleep mode. Contrarily, switch 30 is inactive upon sensing master receiver 25 as being in an active mode of operation. In this embodiment, master receiver 25 further comprises a timing scheme which switches master receiver from active mode to sleep mode. This timing scheme is enabled when a predetermined period passes in master receiver 25 without receiving any data from transmitter 10. The length of the period is dependent on several design criteria including the system's application and environment, as well as the desired probabilities of error. In a further embodiment of the present invention, switch 30, low power receiver 20 and master receiver 25 are all positioned on a radio frequency identification ("RFID") tag.

Figure 2:
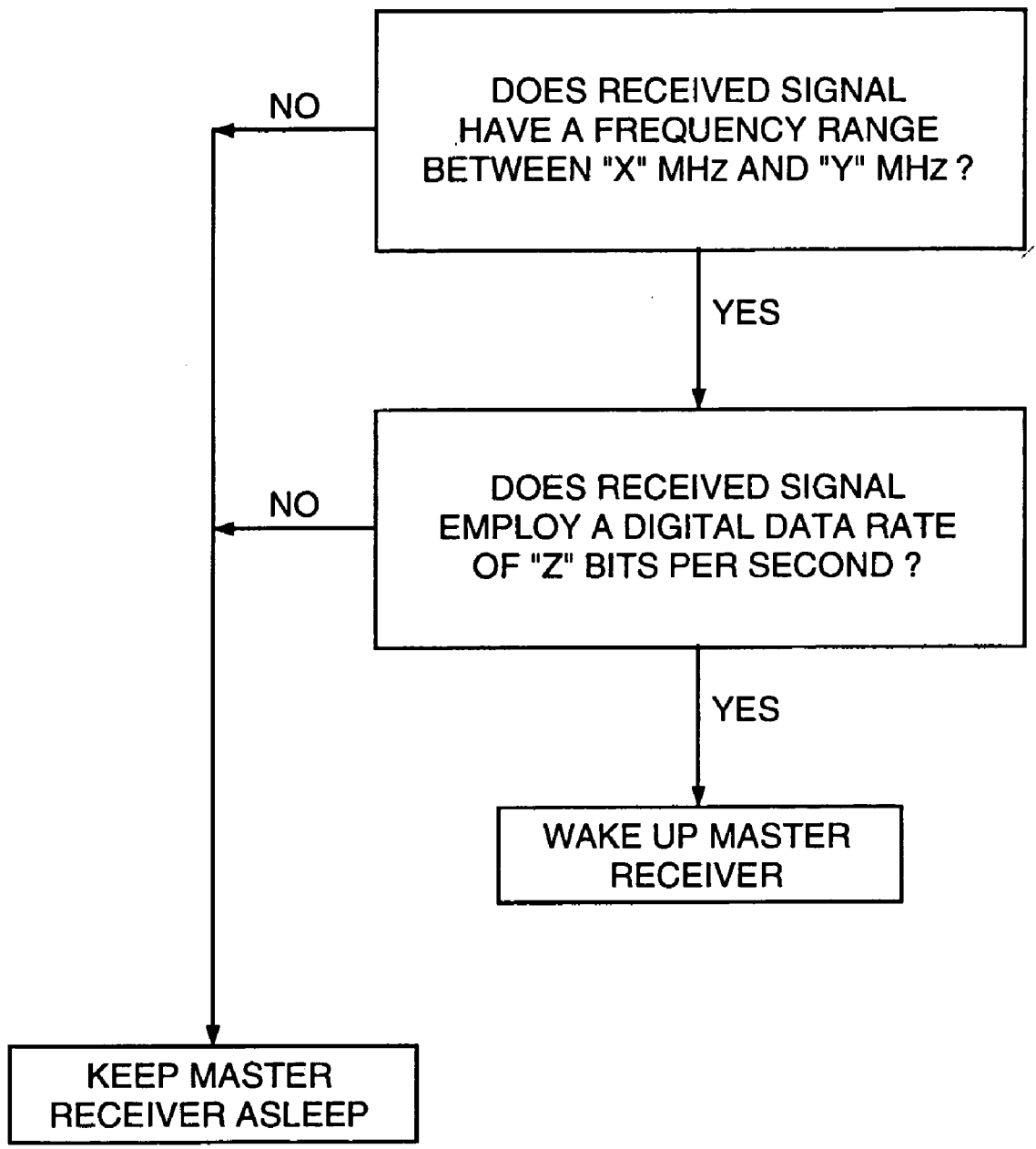
FIG. 2 is a flow chart illustrating the method of the present invention.

Referring to FIG. 2, a flow chart illustrating the method for reducing the consumption of energy in operating a communications system of the present invention employing the architecture described herein. Initially, a wake up signal is transmitted by transmitter 10, and subsequently, the wake up signal is detected by wake up receiver 20. Finally, the mode of operation of the master receiver 25 is changed in response to the detection of the wake up signal.

In one embodiment of the present invention, the step of detecting the wake up signal, itself, comprises a series of steps. First, a predetermined frequency is detected from the wake up signal. In the event that that frequency is found, a predetermined data rate is detected from the wake up signal. If that frequency is not found, master receiver 25 is kept asleep. In the event that data rate of transmission of a certain number of bits per second is found, an output signal is generated. If that data rate of transmission is not found, master receiver 25 is kept asleep. This step of generating an output signal further comprises the step of comparing the output signal with a reference voltage. By doing so, switch 30 is enabled upon detecting a predetermined frequency and a predetermined data rate of transmission and master receiver 25 is woken.

Figure 3:
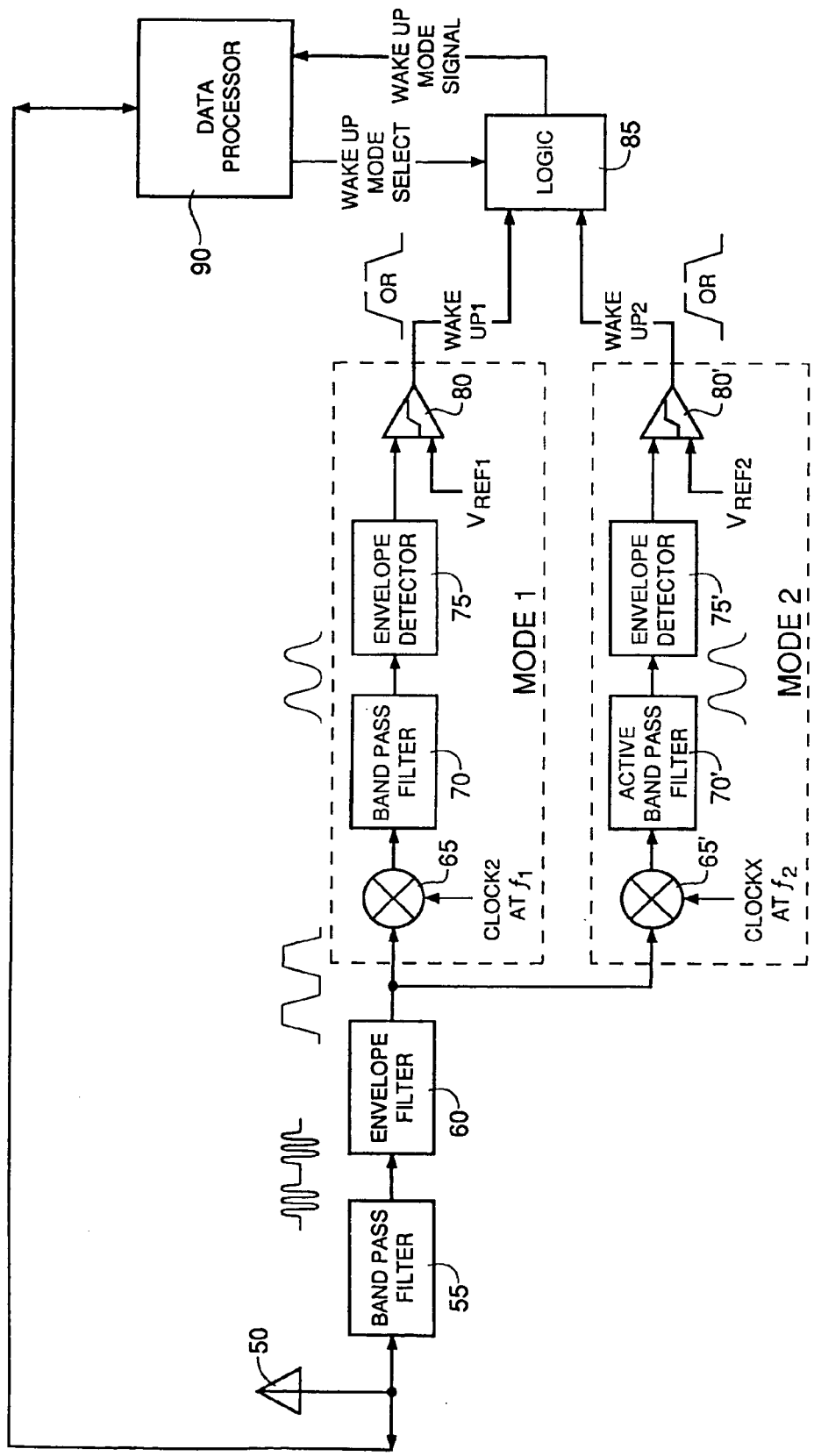
FIG. 3 illustrates a first embodiment of the present invention.

Referring to FIG. 3, a first embodiment of the present invention is depicted. In order to receive a wake up signal, an antenna 50 is coupled with a frequency detector, realized by a first bandpass filter 55 having a bandwidth and a radio frequency ("RF") output. First bandpass filter 55, operating in tandem with antenna 59, detects the frequency of the wake up signal. To avert the detection of noise as a wake up signal, the bandwidth of first bandpass filter 55 is substantially narrow. Nonetheless, in the preferred embodiment, first bandpass filter 55 must detect a predetermined frequency and a related harmonic.

While the present invention utilizes a narrow bandpass scheme for frequency detection, it should be obvious to one of ordinary skill in the art that the frequency detector can be realized using alternate hardware. For example, in place of a narrow bandpass filter, a generalized filter having an output coupled directly with a comparator would achieve the identical functional purpose were the comparator also fed a frequency reference or source. Another example would be a resonator circuit.

Coupled to bandpass filter 55 is an envelope detector 60. Upon receiving the RF bandpass output from filter 55, envelope detector 60 demodulates the RF bandpass output into a first Base Band ("BB") signal. Envelope detector 60 achieves this objective in two steps. However, it should be obvious to one of ordinary skill in the art that the functional objective of envelope detector 60 can be realized by alternate means. Initially, envelope detector 60 rectifies the RF bandpass output by means of a rectifier. Subsequently, a low pass filter is employed for filtering the rectified RF bandpass output and forming the first BB signal.

Once the frequency of the wake up signal has been detected, the present invention employs a data rate detector for detecting the rate of data transmission of the incoming signal, which thereby rejects out of data rate signals. As such, this design employs two means for assessing two characteristics of the incoming signal. Thus, by this approach, noise and/or other sources will not falsely trigger the master receiver into waking up.

The data rate detector can be realized by a second bandpass filter 70 having a second bandwidth and a second BB signal as its output. To avert the detection of noise as a wake up signal, the second bandwidth of bandpass filter 55 is substantially narrow bandwidth. In one embodiment of the present invention, the second bandwidth is substantially narrower than the first bandwidth of the first bandpass filter. However, in the preferred embodiment, the second bandwidth need only detect a singular frequency without any harmonics.

While the present invention utilizes the herein described means for data rate detection, it should be obvious to one of ordinary skill in the art that the data rate detector can be realized using alternate hardware. For example, a comparator scheme or resonator circuit could be employed. Further, digital circuitry could also be used to accomplish the same purpose as the data detector described herein.

Further, coupled with second bandpass filter 70 is a second envelope detector 75. In order to detect the data rate of incoming signal and ascertain whether it is the wake up signal, second envelope detector 75 generates an output signal corresponding to BB signal input received from second bandpass filter 70 by demodulating the BB signal input. Second envelope detector 75 achieves this objective in two steps. However, it should be obvious to one of ordinary skill in the art that the functional objective of second envelope detector 75 can be realized by alternate means. Initially, envelope detector 75 rectifies the BB input signal second bandpass filter 70 by means of a rectifier. Subsequently, a low pass filter is employed for filtering the rectified BB signal input. As a result of this architecture, second envelope detector 75 generates a upward ramped step or a downward ramped step output signal.

Coupled to second envelope detector 75 is a comparator 80. Comparator 80 is employed to compare the output signal of second envelope detector 75 with a voltage reference. By this arrangement, comparator 80 triggers a internal wake $up_1$ signal. Wake $up_1$ signal is subsequently fed into control logic 85, which is coupled with a data processor 90, for waking up the master receiver 25.

In an alternate embodiment of the present invention, a second data rate detector is utilized. Second data rate detector, being coupled to the frequency detector, receives the first BB signal generated by the first envelope detector 60. The second data rate detector can be designed in an identical fashion as the first data detector described herein.

By this arrangement, comparator 80 triggers a internal wake $up_2$ signal which is input into control logic 85, which is coupled with a data processor 90, for waking up the master receiver 25. By employing two data rate detectors, the wake up receiver can switch the data rate to be detected from the wake up signal. Here, switching logic 85 in combination with data processor 90 recognize the data rate to be detected from the wake up signal. Subsequently, when a change is necessary, a second data rate is selected as being the data rate to be detected from the wake up signal for the purposes of waking master receiver 25.

Moreover, this two data rate detector scheme can also be employed for the purpose of enabling the wake up receiver to switch modes of operation—ie., sleep mode and active mode—as described hereinabove. Thus, when a first data rate is received, master receiver 25 is to be woken in to active mode, while master receiver 25 is to be put into sleep mode when a second data rate is received.

In a further alternate embodiment of the present invention, a mixer 65 is employed. Mixer 65 is coupled between first envelope detector 60 and second bandpass filter 70. Mixer 65 is used to provide a means for frequency translating the RF bandpass output. The extent of the translation performed by mixer 65 corresponds to the local oscillator. The local oscillator, having a clock rate of $f_1$, provides a reference oscillating signal to the mixer 65.

Figure 4:
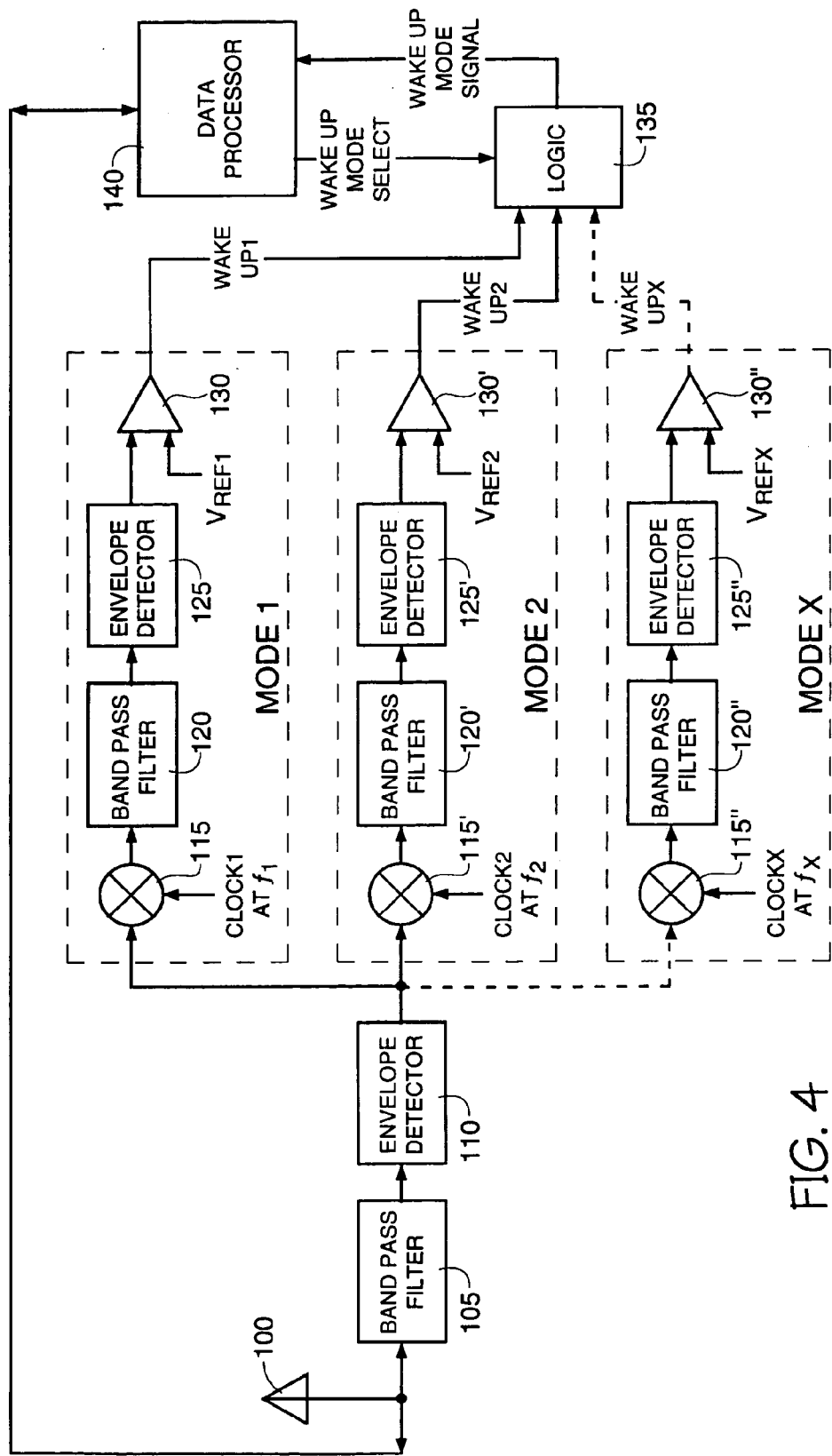
FIG. 4 illustrates a second embodiment of the present invention.

Referring to FIG. 4, an alternate embodiment of the present invention is illustrated. The architecture disclosed here is further development of an alternate embodiment of FIG. 3. Here, three data rate detectors are employed. Third data rate detector, being coupled to the frequency detector, receives the first BB signal generated by a first envelope detector 110. The third data rate detector can be designed in an identical fashion as the first and second data detectors described herein.

By this arrangement, comparator 130''' triggers a internal wake up$_x$ signal which is input into control logic 135, which is coupled with a data processor 140, for waking up the master receiver 25. By employing three data rate detectors, the wake up receiver can switch the data rate to be detected from the wake up signal. Here, switching logic 135 in combination with data processor 140 recognize the data rate to be detected from the wake up signal. Subsequently, when a change is necessary, a third data rate is selected as being the data rate to be detected from the wake up signal for the purposes of waking master receiver 25.

In still another embodiment of the present invention, a modulation detector (not shown) is further incorporate for detecting a modulation scheme. In this embodiment, the wake up signal must also comprise a modulation format or formats. As such, the modulation detector can detect a modulation scheme selected from the group including at least amplitude modulation, frequency modulation, amplitude shift key modulation, phase shift key modulation, frequency shift key modulation, and multiphase frequency shift key modulation. The modulation detector can be realized by a variety of designs known to one of ordinary skill in the art. Thus, upon receiving the wake up signal, the modulation detector detects the format of the wake up signal and responds accordingly.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. For example, it should be obvious to one of ordinary skill in the art that either or both first and second communications devices, such as transmitter 10 and a receiver 25, can further comprise transceiver properties for the purposes of the present invention. It is therefore contemplated that the appended claims will cover any such modifications or embodiments as fall within the true scope of the invention.

All of the U.S. patents cited herein are hereby incorporated by reference as if set forth in their entirety.

The invention claimed is:

1. A radio communications system comprising:
   a master receiver circuit having a sleep mode and an active mode, the master receiver circuit being configured to consume less power in the sleep mode than in the active mode;
   a switch circuit configured to control when the master receiver circuit switches between the sleep mode and the active mode;
   a receiver input configured to receive radio signals; and
   a wake-up detector circuit, coupled to the receiver input, including:
      circuitry configured to reject any of said radio signals not having a data rate equal to a single, specific, predetermined, first data rate, and to generate a wake-up mode signal when the receiver input receives a radio signal having a data rate equal to said first data rate;
   wherein the switch circuit switches the master receiver from the sleep mode to the active mode in response to the data rate detector circuit generating said wake-up mode signal; and
   wherein the switch circuit does not switch the master receiver from the sleep mode to the active mode in response to the receiver input receiving a radio signal having a data rate not equal to said first data rate.

2. A radio communications system according to claim 1, wherein, while the master receiver circuit is in the sleep mode, the switch circuit continuously and uninterruptibly maintains the master receiver circuit in the sleep mode until the data rate detector circuit generates said wake-up mode signal.

3. A radio communications system according to claim 1, further comprising a second data rate detector circuit that detects when the receiver input receives a radio signal having a second data rate, said second data rate being different from said first data rate, wherein the second data rate detector is connected to control the switch circuit so as to switch the master receiver circuit to the sleep mode in response to the receiver input receiving a radio signal having said second data rate.

4. A radio communications system according to claim 1, and further comprising a radio transmitter, wherein, at a time when the master receiver circuit is in its sleep mode, the radio transmitter transmits a signal having the first data rate so as to put the master receiver circuit into its active mode, and wherein, at a time when the master receiver circuit is in its active mode, the radio transmitter transmits data to the radio communications receiver.

5. A method of changing a radio communications receiver from a sleep mode to an active mode, comprising:
   providing a radio communications receiver having a sleep mode and an active mode, wherein the receiver continuously and uninterruptibly consumes less electrical power in the sleep mode than in the active mode;
   receiving radio signals at an input of the receiver;
   filtering said radio signals received in the receiving step so as to reject any of said radio signals not having a data rate equal to a single, specific, predetermined, first data rate;
   while the receiver is in the sleep mode, detecting when the receiver receives a radio signal that has a data rate equal to said first data rate and that is not rejected by the filtering step; and
   switching the receiver from the sleep mode to the active mode in response to detecting said first data rate.

6. A method according to claim 5, further comprising, while the receiver is in the sleep mode, continuously and uninterruptibly maintaining the receiver in the sleep mode until the receiver receives a radio signal that has a data rate equal to said first data rate and that is not rejected by the filtering.

7. A method according to claim 5, further comprising detecting when the receiver receives a radio signal having a data rate equal to a second predetermined data rate, wherein the second data rate is different from the first data rate; and
   in response to detecting said second data rate, switching the receiver to the sleep mode, and then continuously and uninterruptibly maintaining the receiver in the sleep mode until detecting said first data rate again.

8. A method according to claim 5, further comprising:
   at a time when the receiver is in its sleep mode, transmitting from a radio transmitter a signal having the predetermined data rate so as to put the master receiver circuit into its active mode; and
   at a time when the receiver is in its active mode, transmitting data from the radio transmitter to the receiver.

9. A radio communications system comprising:
   a receiver having a sleep mode and an active mode such that, in operation, the receiver continuously and uninterruptibly consumes less power in the sleep mode than in the active mode;
   a receiver input for receiving radio signals; and
   a wake-up detector circuit coupled to the receiver input including:
      circuitry that rejects any of said radio signals not having data rate equal to a predetermined, first data rate, and that generates a wake-up mode signal only when the receiver input receives a radio signal having a data rate equal to said first data rate;
   wherein the receiver is configured to switch from the sleep mode to the active mode in response to the data rate detector circuit generating said wake-up mode signal.

10. A radio communications system according to claim 9, wherein the switch circuit does not switch the master receiver from the sleep mode to the active mode in response to the receiver input receiving a radio signal having a data rate not equal to said first data rate.

11. A radio communications system according to claim 9 further comprising:
   a second data rate detector circuit that detects when the receiver input receives a radio signal having a second data rate, said second data rate being different from said first data rate;
   wherein the receiver is configured to switch to the sleep mode in response to the receiver input receiving a radio signal having said second data rate.

12. A radio communications system according to claim 9 further comprising:
   a radio transmitter;
   wherein the radio transmitter is configured to transmit, at a time when the master receiver circuit is in its sleep mode, a signal having the first data rate so as to put the receiver into its active mode; and
   wherein, at a time when the receiver is in its active mode, the radio transmitter transmits data to the receiver.

13. A method of changing a radio communications receiver from a sleep mode to an active mode, comprising:
   providing a receiver having a sleep mode and an active mode, wherein, in operation, the receiver continuously consumes less electrical power in the sleep mode than in the active mode;
   receiving radio signals at an input of the receiver;
   rejecting any of said radio signals not having a data rate equal to a predetermined first data rate;
   while the receiver is in the sleep mode, continuously maintaining the receiver in the sleep mode until the receiver receives a radio signal that has a data rate equal to said first data rate and that is not rejected;
   while the receiver is in the sleep mode, detecting when the receiver receives a radio signal that has a data rate equal to said first data rate and that is not rejected; and
   switching the receiver from the sleep mode to the active mode in response to detecting said first data rate.

14. A method according to claim 13, further comprising the subsequent steps of:
   detecting when the receiver receives a radio signal having a data rate equal to a second predetermined data rate, wherein the second data rate is different from the first data rate; and
   in response to detecting said second data rate, switching the receiver to the sleep mode, and then continuously maintaining the receiver in the sleep mode until detecting said first data rate again.

15. A method according to claim 13, further comprising the steps of:
   at a time when the receiver is in its sleep mode, transmitting from a radio transmitter a signal having the predetermined data rate so as to put the master receiver circuit into its active mode; and
   at a time when the receiver is in its active mode, transmitting data from the radio transmitter to the receiver.

* * * * *

UNITED STATES PATENT AND TRADEMARK OFFICE
CERTIFICATE OF CORRECTION

PATENT NO. : 7,142,838 B2 Page 1 of 1
APPLICATION NO. : 10/869508
DATED : November 28, 2006
INVENTOR(S) : Rotzoll It is certified that error appears in the above-identified patent and that said Letters Patent is hereby corrected as shown below:

Col. 5, line 37, please delete "incorporate" after "further" and insert --incorporated--.

Signed and Sealed this

Fourth Day of December, 2007

JON W. DUDAS
*Director of the United States Patent and Trademark Office*